Sept. 23, 1941.    C. C. WHITE    2,257,018
MANUFACTURE OF STORAGE BATTERY ELECTRODES
Filed July 24, 1940

INVENTOR
Curtice C. White
BY
Augustus B. Stoughton
ATTORNEY.

WITNESS:

Patented Sept. 23, 1941

2,257,018

UNITED STATES PATENT OFFICE 2,257,018

MANUFACTURE OF STORAGE BATTERY ELECTRODES

Curtice C. White, Johnsville, Pa., assignor to The Electric Storage Battery Company, Philadelphia, Pa., a corporation of New Jersey Application July 24, 1940, Serial No. 347,215

2 Claims. (Cl. 136—67)

The present invention relates to the so-called tubular type of storage battery electrodes or plates. Such plates or electrodes consist of pencils of active material mounted on spines connected to top and bottom bars and provided with tubular retainers made of fabric. The end portions of the spines and the tubular retainers are longer than the pencils of active material and in order to properly enclose the active material or material to become active the ends of the tubular retainers are secured or attached to the projecting ends of the spines.

The object of the present invention is to provide an inexpensive, expeditious and satisfactory method of securing and fastening the ends of the tubular fabric which project beyond the ends of the pencil; another object of the invention is to reduce the cost and simplify the manufacture of storage battery electrodes or plates of the tubular type.

Other objects of the invention appear from the following description at the end of which the invention will be claimed.

Generally stated, the invention consists in fabricating the tubular retainers from fibers thermoplastic at moderate heat, and moderately heating the ends of the tubes that project beyond the pencils and contracting the end portions of the tubes into contact with the end portions of the spines which project beyond the pencils thus opposing fraying and longitudinal contraction.

The invention also comprises the improvements to be presently described and finally claimed.

In the following description reference will be made to the accompanying drawing forming part hereof and in which, Figure 1 is a diagrammatic view with parts broken away illustrating a step in the process of the invention.

Figures 1, 2, 3:
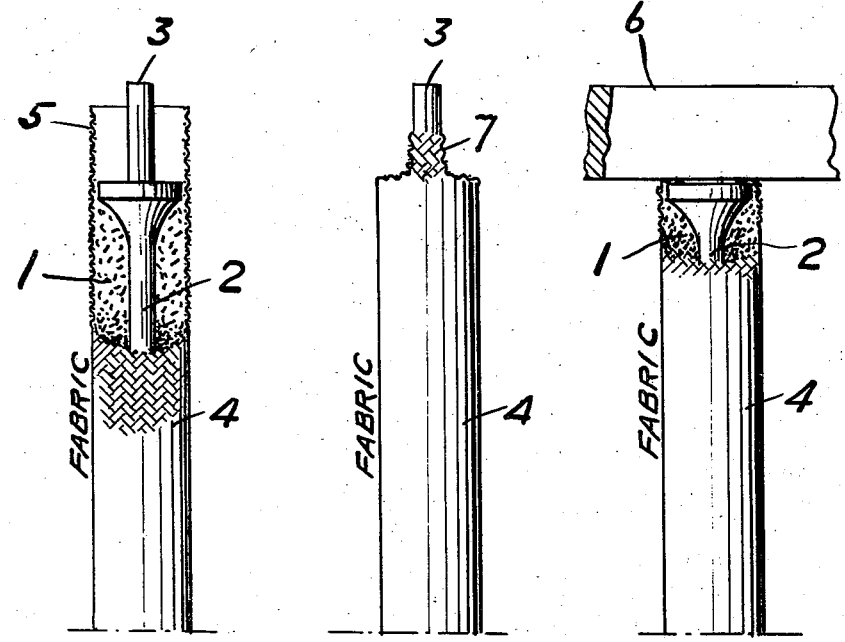
Figure 2 is a view illustrating the finished product of the method of the invention.
Figure 3 is a diagrammatic view illustrating the assembly of the product shown in Figure 2 with a top bar.

Referring to the drawing, 1 indicates a pencil of active material or material to become active mounted on a spine 2. The end 3 of the spine 2 projects beyond the pencil 1. 4 is a fabric tube knitted, woven or braided and it covers the active material 1. The end 5 of the fabric tube 4 projects beyond the pencil 1.

Figure 4:
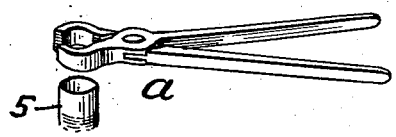
Figure 4 is a diagrammatic view illustrating a step in the process.

According to the present invention the projecting ends 3 and 5 are fastened and sealed by a method which will now be described. The tube is fabricated from fibers or filaments, thermoplastic at moderate temperature. Vinyl resin possesses the requisite qualities and "Lucite" and "Vinylite" are examples of that material which may be advantageously employed in the practice of the invention. Good results are attained by fabricating the tube 4 from "Lucite" fibers and the ends 5 of the tube are moderately heated and contracted into contact with the end portion of the spine. This is indicated in Figure 2, and at $a$ in Figure 4 is indicated a means for accomplishing that result. The means comprise a two-part mold in this instance including handles pivoted together or tongs and this tool is moderately heated, sufficiently hot to make the material of the tube plastic, so that it can be contracted onto the spine 3 and when cool it acquires a permanent set.

Referring to Figure 3, 6 indicates the top bar of a plate or electrode of the type described and the end 3 of the spine is mounted in it. The contracted portion 7 of the tube may be incorporated in the top bar 6.

It is a characteristic of tubes made of the fibers indicated that under moderate heat they are brought to a condition in which they oppose fraying of the fabric at its ends, and since the projecting ends of the tubes are secured to the projecting ends of the spines as described shortening of the tubes in use is opposed. These qualities therefore materially improve plates of the type described in which the tubes are manufactured from such fibers. By the present invention the pencils of active material are sealed and enclosed in such a way that detached particles may not escape and fall to the bottom of the cell.

It will be obvious to those skilled in the art to which the invention relates that modifications may be made in details of procedure without departing from the spirit of the invention which is not limited to such matters or otherwise than the appended claims may require.

I claim:

1. In the manufacture of storage battery electrodes comprising pencils of active material or material to become active mounted on spines of which the ends project beyond the pencils which latter are covered with tubular fabric retainers of which the ends also project beyond the pencil, the improvement in fastening and sealing the projecting ends of the tubes to the projecting ends of the spine which consists in fabricating the tubes from filaments thermoplastic upon the application of moderate heat, and moderately heating the ends of the tubes that project beyond the pencils and contracting the end portions of the tubes while plastic into contact with the end portion of the spines.

2. In the manufacture of storage battery electrodes comprising pencils of active material or material to become active mounted on spines of which the ends project beyond the pencils which latter are covered with tubular fabric retainers of which the ends also project beyond the pencil, the improvement in fastening and sealing the projecting ends of the tubes to the projecting ends of the spine which consists in fabricating the tubes from vinyl resin filaments thermoplastic at moderate heat, and moderately heating the ends of the tubes that project beyond the pencils and contracting the end portions of the tubes while plastic into contact with the end portion of the spines.

CURTICE C. WHITE.